United States Patent
Hooli et al.

(10) Patent No.: US 11,882,595 B2
(45) Date of Patent: Jan. 23, 2024

(54) METHOD, SYSTEM AND APPARATUS FOR NEW RADIO BANDWIDTH PART OPERATIONS

(71) Applicant: Nokia Technologies Oy, Espoo (FI)

(72) Inventors: Kari Juhani Hooli, Oulu (FI); Esa Tapani Tiirola, Kempele (FI); Timo Erkki Lunttila, Espoo (FI); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 37 days.

(21) Appl. No.: 17/053,990

(22) PCT Filed: May 14, 2018

(86) PCT No.: PCT/EP2018/062299
§ 371 (c)(1),
(2) Date: Nov. 9, 2020

(87) PCT Pub. No.: WO2019/219155
PCT Pub. Date: Nov. 21, 2019

(65) Prior Publication Data
US 2021/0243807 A1    Aug. 5, 2021

(51) Int. Cl.
*H04W 74/08* (2009.01)
*H04W 72/0453* (2023.01)
*H04W 74/00* (2009.01)

(52) U.S. Cl.
CPC ... *H04W 74/0816* (2013.01); *H04W 72/0453* (2013.01); *H04W 74/008* (2013.01)

(58) Field of Classification Search
CPC ......... H04W 74/0816; H04W 72/0453; H04W 74/008; H04W 74/0808
(Continued)

(56) References Cited

U.S. PATENT DOCUMENTS 11,025,372 B2 * 6/2021 Chen ................... H04L 1/1896
2019/0132824 A1 * 5/2019 Jeon ..................... H04L 5/0092
(Continued)

FOREIGN PATENT DOCUMENTS

WO    2018/085145 A1    5/2018
WO    2019/193402 A1    10/2019

OTHER PUBLICATIONS

"New SID on NR-based Access to Unlicensed Spectrum", 3GPP TSG RAN Meeting #75, RP-170828, Agenda : 9.1, Qualcomm, Mar. 6-9, 2017, 5 pages.
(Continued)

*Primary Examiner* — Hassan Kizou
*Assistant Examiner* — Oladiran Gideon Olaleye
(74) *Attorney, Agent, or Firm* — Harrington & Smith

(57) ABSTRACT

An apparatus comprising means for: receiving a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining which of the at least two bandwidth parts is used for a transmission burst; determining for the transmission burst a second, temporal, bandwidth part configuration caused to determine the transmission parameters for the transmission burst based on the at least one associated temporal bandwidth part and the determining which of the at least two bandwidth parts is used for the transmission burst.

15 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0132862 A1* | 5/2019 | Jeon ...................... | H04L 5/0064 |
| 2019/0149380 A1* | 5/2019 | Babaei .............. | H04W 72/1268 |
| | | | 370/330 |
| 2019/0253230 A1* | 8/2019 | Loehr ................. | H04W 72/042 |
| 2019/0253531 A1* | 8/2019 | Basu Mallick ....... | H04W 28/20 |
| 2019/0261405 A1* | 8/2019 | Ang .................. | H04W 72/0446 |
| 2019/0274162 A1* | 9/2019 | Zhang .................. | H04W 74/08 |
| 2019/0289513 A1* | 9/2019 | Jeon ...................... | H04L 5/0098 |
| 2019/0313437 A1* | 10/2019 | Jung ................... | H04W 74/006 |
| 2021/0058964 A1* | 2/2021 | Hooli .................... | H04L 5/0062 |

OTHER PUBLICATIONS

"Potential Solutions and Techniques for NR Unlicensed", 3GPP TSG RAN WG1 Meeting #92, R1-1802526, Agenda : 7.6.4, Nokia, Feb. 26-Mar. 2, 2018, 10 pages.

"Draft LS on BWP Switching Delay", 3GPP TSG-RAN WG4 Meeting #86, R4-1803283, Intel Corporation, Feb. 26-Mar. 2, 2018, 2 pages.

"Physical Layer Procedures for NR Unlicensed Operation", 3GPP TSG RAN WG1 Meeting #92bis, R1-1804582, Agenda : 7.6.4, LG Electronics, Apr. 16-20, 2018, 5 pages.

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.

"3rd Generation Partnership Project; Technical Specification Group Radio Access Network; NR; Multiplexing and channel coding (Release 15)", 3GPP TS 38.212, V15.1.1, Apr. 2018, pp. 1-94.

"3rd Generation Partnership Project; Technical Specification Group Radio Access Network; Study on Licensed-Assisted Access to Unlicensed Spectrum; (Release 13)", 3GPP TR 36.889, V13.0.0, Jun. 2015, 285 pages.

International Search Report and Written Opinion received for corresponding Patent Cooperation Treaty Application No. PCT/EP2018/062299, dated Dec. 11, 2018, 14 pages.

"On Wideband Operation for NR-U", 3GPP TSG RAN WG1 Meeting #93, R1-1806112, Agenda : 7.6.4.5, Nokia, May 21-25, 2018, 6 pages.

"Discussion on the Channel Access Procedures", 3GPP TSG RAN WG1 Meeting #93, R1-1806086, Agenda : 7.6.4.1, Vivo, May 21-25, 2018, 5 pages.

"Numerology and Wideband Operation in NR Unlicensed", 3GPP TSG RAN WG1 Meeting #92bis, R1-1803677, Agenda : 7.6.5, Huawei, Apr. 16-20, 2018, 8 pages.

Office action received for corresponding Indian Patent Application No. 202017049436, dated Dec. 8, 2021, 8 pages.

* cited by examiner

METHOD, SYSTEM AND APPARATUS FOR NEW RADIO BANDWIDTH PART OPERATIONS

RELATED APPLICATION

This application claims priority to PCT Application No. PCT/EP2018/062299, filed on May 14, 2018, which is incorporated herein by reference in its entirety.

FIELD

The present application relates to a method, apparatus, and computer programs and in particular but not exclusively to methods, apparatus, and computer programs related to New Radio bandwidth part operations within a wideband carrier based communications systems.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE) or mobile station (MS). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. NR Rel-15 has been defined for different licensed band scenarios covering carrier frequencies up-to ~52 GHz. The scope of new NR-U study items is to provide NR support for different unlicensed band scenarios.

SUMMARY

In a first aspect there is provided an apparatus comprising means for: receiving a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining which of the at least two bandwidth parts is used for a transmission burst; determining for the transmission burst a second, temporal, bandwidth part configuration caused to determine the transmission parameters for the transmission burst based on the at least one associated temporal bandwidth part and the determining which of the at least two bandwidth parts is used for the transmission burst.

The at least two bandwidth parts may at least partially overlap in frequency.

A bandwidth of each of the at least one associated temporal bandwidth parts may be less than the bandwidth of the first bandwidth part.

The means may be further configured for generating the second temporal bandwidth part configuration from the first bandwidth part configuration by modifying first bandwidth part configuration parameters.

The means for modifying the first bandwidth part configuration parameters may be configured for performing at least one of: truncating; padding; masking; and shifting, the configuration parameter values or configuration parameter ranges of the first bandwidth part configuration.

The means may be further configured for: receiving at least one other bandwidth part configuration, and determining which of the at least two received bandwidth part configurations is active, wherein the means for determining which of the at least two received bandwidth part configurations is active may be based on one of: a radio resource control signaling; a received indicator within a downlink assignment; a received indicator within an uplink grant; and a first inactivity timer, the expiration of the inactivity timer indicating the active bandwidth part configuration is a default bandwidth part configuration.

The means for determining which of the at least two bandwidth parts is used for a transmission burst may be further based on at least one of: at least one received signal from a further apparatus; and a determination of the proceeding preceding transmission bandwidth part configuration or proceeding preceding transmission bandwidth part, The first bandwidth configuration may be active when the second bandwidth configuration is employed.

The means may be further configured for determining during the transmission burst a second, temporal, bandwidth part configuration caused to determine transmission parameters for the succeeding transmission.

The means for determining during the transmission burst a second, temporal, bandwidth part configuration caused to determine transmission parameters for the succeeding transmission burst may be configured for determining during the transmission a second, temporal, bandwidth part configuration caused to determine transmission parameters for the succeeding transmission part based on one of: determining which of the at least two bandwidth parts is active during the succeeding transmission burst; determining which of the at least two bandwidth parts are active after a determined inactivity time period determined by a second inactivity timer; and a received indicator controlling the apparatus to use the same second, temporal, bandwidth part configuration.

The means may be further configured for: receiving a signal during the transmission burst; and transmitting a further signal during the transmission burst.

According to a second aspect there is provided an apparatus comprising means for: transmitting to a further apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the further apparatus is caused to determine which of the at least two bandwidth parts is used for a transmission burst and determine for the transmission burst a second, temporal, bandwidth part configuration such that the further apparatus is caused to determine the transmission parameters for the transmission burst based on the at least one associated temporal bandwidth part and the determining which of the at least two bandwidth parts is used for the transmission burst.

The means may be further configured for: selecting one of the first bandwidth part configuration and at least one other bandwidth part configuration; determining transmission parameters for a transmission burst between the apparatus and the further apparatus based on the selected bandwidth part configuration; and transmitting to the further apparatus the at least one other bandwidth part configuration, wherein the further apparatus is caused to determine which of the at least two received bandwidth part configurations is active.

The means may be further configured for transmitting at least one further signal caused to enable the further apparatus to determine which of the at least two bandwidth parts is used for a transmission burst.

According to a third aspect there is provided a method comprising: receiving a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining which of the at least two bandwidth parts is used for a transmission burst; determining for the transmission burst a second, temporal, bandwidth part configuration caused to determine the transmission parameters for the transmission burst based on the at least one associated temporal bandwidth part and the determining which of the at least two bandwidth parts is used for the transmission burst.

The at least two bandwidth parts may at least partially overlap in frequency.

A bandwidth of each of the at least one associated temporal bandwidth parts may be less than the bandwidth of the first bandwidth part.

The method may comprise generating the second temporal bandwidth part configuration from the first bandwidth part configuration by modifying first bandwidth part configuration parameters.

The modifying the first bandwidth part configuration parameters may comprise performing at least one of: truncating; padding; masking; and shifting, the configuration parameter values or configuration parameter ranges of the first bandwidth part configuration.

The method may further comprise: receiving at least one other bandwidth part configuration, and determining which of the at least two received bandwidth part configurations is active, wherein determining which of the at least two received bandwidth part configurations is active may be based on one of: a radio resource control signaling; a received indicator within a downlink assignment; a received indicator within an uplink grant; and a first inactivity timer, the expiration of the inactivity timer indicating the active bandwidth part configuration is a default bandwidth part configuration.

The determining which of the at least two bandwidth parts is used for a transmission burst may be further based on at least one of: at least one received signal from an apparatus; and a determination of the preceding transmission bandwidth part configuration or proceeding preceding transmission bandwidth part, The first bandwidth configuration may be active when the second bandwidth configuration is employed.

The method may further comprise determining during the transmission burst a second, temporal, bandwidth part configuration caused to determine transmission parameters for the succeeding transmission.

The determining during the transmission burst a second, temporal, bandwidth part configuration caused to determine transmission parameters for the succeeding transmission burst may comprise determining during the transmission a second, temporal, bandwidth part configuration caused to determine transmission parameters for the succeeding transmission part based on one of: determining which of the at least two bandwidth parts is active during the succeeding transmission burst; determining which of the at least two bandwidth parts are active after a determined inactivity time period determined by a second inactivity timer; and a received indicator controlling the apparatus to use the same second, temporal, bandwidth part configuration.

The method may further comprise: receiving a signal during the transmission burst; and transmitting a further signal during the transmission burst.

According to a fourth aspect there is provided a method comprising: transmitting to an apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the apparatus is caused to determine which of the at least two bandwidth parts is used for a transmission burst and determine for the transmission burst a second, temporal, bandwidth part configuration such that the apparatus is caused to determine the transmission parameters for the transmission burst based on the at least one associated temporal bandwidth part and the determining which of the at least two bandwidth parts is used for the transmission burst.

The method may further comprise: selecting one of the first bandwidth part configuration and at least one other bandwidth part configuration; determining transmission parameters for a transmission burst based on the selected bandwidth part configuration; and transmitting to the apparatus the at least one other bandwidth part configuration, wherein the apparatus is caused to determine which of the at least two received bandwidth part configurations is active.

The method may further comprise transmitting at least one further signal caused to enable the apparatus to determine which of the at least two bandwidth parts is used for a transmission burst.

According to a fifth aspect there is provided an apparatus comprising at least one processor, and at least one memory including computer program code, wherein the at least one memory and the computer program code are configured, with the at least one processor, to cause the apparatus to: receive a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determine which of the at least two bandwidth parts is used for a transmission burst; determine for the transmission burst a second, temporal, bandwidth part configuration caused to determine the transmission parameters for the transmission burst based on the at least one associated temporal bandwidth part and the determining which of the at least two bandwidth parts is used for the transmission burst.

The at least two bandwidth parts may at least partially overlap in frequency.

A bandwidth of each of the at least one associated temporal bandwidth parts may be less than the bandwidth of the first bandwidth part.

The apparatus may further be caused to generate the second temporal bandwidth part configuration from the first bandwidth part configuration by modifying first bandwidth part configuration parameters.

The apparatus caused to modify the first bandwidth part configuration parameters may be caused to perform at least one of: truncating; padding; masking; and shifting, the configuration parameter values or configuration parameter ranges of the first bandwidth part configuration.

The apparatus may further be caused to: receive at least one other bandwidth part configuration, and determine which of the at least two received bandwidth part configurations is active, wherein the apparatus caused to determine which of the at least two received bandwidth part configurations is active may be based on one of: a radio resource control signaling; a received indicator within a downlink assignment; a received indicator within an uplink grant; and a first inactivity timer, the expiration of the inactivity timer indicating the active bandwidth part configuration is a default bandwidth part configuration.

The apparatus causes to determine which of the at least two bandwidth parts is used for a transmission burst may be further based on at least one of: at least one received signal from an apparatus; and a determination of the preceding transmission bandwidth part configuration or preceding transmission bandwidth part, The first bandwidth configuration may be active when the second bandwidth configuration is employed.

The apparatus may be further caused to determine during the transmission burst a second, temporal, bandwidth part configuration caused to determine transmission parameters for the succeeding transmission.

The apparatus caused to determine during the transmission burst a second, temporal, bandwidth part configuration caused to determine transmission parameters for the succeeding transmission burst may be caused to determine during the transmission a second, temporal, bandwidth part configuration caused to determine transmission parameters for the succeeding transmission part based on one of: determining which of the at least two bandwidth parts is active during the succeeding transmission burst; determining which of the at least two bandwidth parts are active after a determined inactivity time period determined by a second inactivity timer; and a received indicator controlling the apparatus to use the same second, temporal, bandwidth part configuration.

The apparatus may be further caused to: receive a signal during the transmission burst; and transmitting a further signal during the transmission burst.

According to a sixth aspect there is provided an apparatus comprising at least one processor, and at least one memory including computer program code, wherein the at least one memory and the computer program code are configured, with the at least one processor, to cause the apparatus to: transmit to a further apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the further apparatus is caused to determine which of the at least two bandwidth parts is used for a transmission burst and determine for the transmission burst a second, temporal, bandwidth part configuration such that the further apparatus is caused to determine the transmission parameters for the transmission burst based on the at least one associated temporal bandwidth part and the determining which of the at least two bandwidth parts is used for the transmission burst.

The apparatus may further be caused to: select one of the first bandwidth part configuration and at least one other bandwidth part configuration; determine transmission parameters for a transmission burst based on the selected bandwidth part configuration; and transmit to the further apparatus the at least one other bandwidth part configuration, wherein the further apparatus is caused to determine which of the at least two received bandwidth part configurations is active.

The apparatus may further be caused to transmit at least one further signal caused to enable the further apparatus to determine which of the at least two bandwidth parts is used for a transmission burst.

According to a seventh aspect there is provided a computer program comprising instructions [or a computer readable medium comprising program instructions] for causing an apparatus to perform at least the following: receiving a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining which of the at least two bandwidth parts is used for a transmission burst; determining for the transmission burst a second, temporal, bandwidth part configuration caused to determine the transmission parameters for the transmission burst based on the at least one associated temporal bandwidth part and the determining which of the at least two bandwidth parts is used for the transmission burst.

According to an eighth aspect there is provided a computer program comprising instructions [or a computer readable medium comprising program instructions] for causing an apparatus to perform at least the following: transmitting to a further apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the further apparatus is caused to determine which of the at least two bandwidth parts is used for a transmission burst and determine for the transmission burst a second, temporal, bandwidth part configuration such that the apparatus is caused to determine the transmission parameters for the transmission burst based on the at least one associated temporal bandwidth part and the determining which of the at least two bandwidth parts is used for the transmission burst.

According to a ninth aspect there is provided a non-transitory computer readable medium comprising program instructions for causing an apparatus to perform at least the following: receiving a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining which of the at least two bandwidth parts is used for a transmission burst; determining for the transmission burst a second, temporal, bandwidth part configuration caused to determine the transmission parameters for the transmission burst based on the at least one associated temporal bandwidth part and the determining which of the at least two bandwidth parts is used for the transmission burst.

According to a tenth aspect there is provided a non-transitory computer readable medium comprising program instructions for causing an apparatus to perform at least the following: transmitting to a further apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the further apparatus is caused to determine which of the at least two bandwidth parts is used for a transmission burst and determine for the transmission burst a second, temporal, bandwidth part configuration such that the apparatus is caused to determine the transmission parameters for the transmission burst based on the at least one associated temporal bandwidth part and the determining which of the at least two bandwidth parts is used for the transmission burst.

According to a eleventh aspect there is provided an apparatus comprising: receiving circuitry configured to receive a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining circuitry configured to determine which of the at least two bandwidth parts is used for a transmission burst; determining circuitry configured to determine for the transmission burst a second, temporal, bandwidth part configuration caused to determine the transmission parameters for the transmission burst based on the at least one associated temporal bandwidth part and the determining which of the at least two bandwidth parts is used for the transmission burst.

According to a twelfth aspect there is provided an apparatus comprising: transmitting circuitry configured to transmit to a further apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the further apparatus is caused to determine which of the at least two bandwidth parts is used for a transmission burst and determine for the transmission burst a second, temporal, bandwidth part configuration such that the apparatus is caused to determine the transmission parameters for the transmission burst based on the at least one associated temporal bandwidth part and the determining which of the at least two bandwidth parts is used for the transmission burst.

According to a thirteenth aspect there is provided a computer readable medium comprising program instructions for causing an apparatus to perform at least the following: receiving a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part; determining which of the at least two bandwidth parts is used for a transmission burst; determining for the transmission burst a second, temporal, bandwidth part configuration caused to determine the transmission parameters for the transmission burst based on the at least one associated temporal bandwidth part and the determining which of the at least two bandwidth parts is used for the transmission burst.

According to a fourteenth aspect there is provided a computer readable medium comprising program instructions for causing an apparatus to perform at least the following: transmitting to a further apparatus a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, wherein the further apparatus is caused to determine which of the at least two bandwidth parts is used for a transmission burst and determine for the transmission burst a second, temporal, bandwidth part configuration such that the apparatus is caused to determine the transmission parameters for the transmission burst based on the at least one associated temporal bandwidth part and the determining which of the at least two bandwidth parts is used for the transmission burst.

The apparatus may comprise at least one processor and at least one memory including computer code for one or more programs.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices according to some embodiments are briefly explained with reference to FIGS. 1, 2a and 2b to assist in understanding the technology underlying the described examples.

Figure 1:
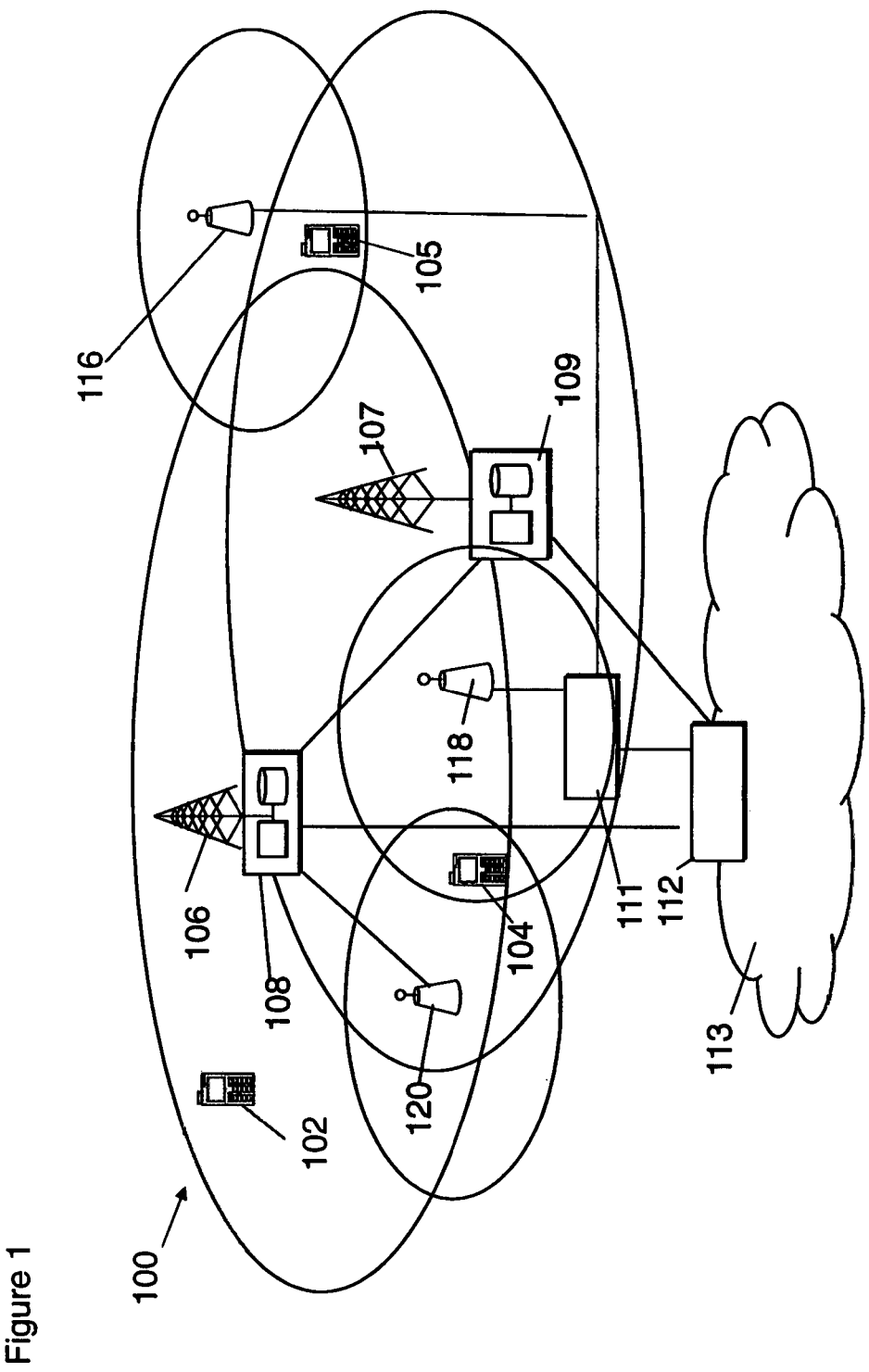
FIG. 1 shows a schematic diagram of an example communication system comprising a base station and a plurality of communication devices suitable for implementing some embodiments.

In a wireless communication system 100, such as that shown in FIG. 1, mobile communication devices or user equipment (UE) 102, 104, 105 are provided wireless access via at least one base station or similar wireless transmitting and/or receiving node or point. Base stations (BTS, NodeB (NB), enhanced NodeB (eNB), gNB) are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller or a base station controller (BSC).

LTE systems may however be considered to have a so-called "flat" architecture, without the provision of RNCs; rather the NB is in communication with a system architecture evolution gateway (SAE-GW) and a mobility management entity (MME), which entities may also be pooled meaning that a plurality of these nodes may serve a plurality (set) of gNBs.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2A:
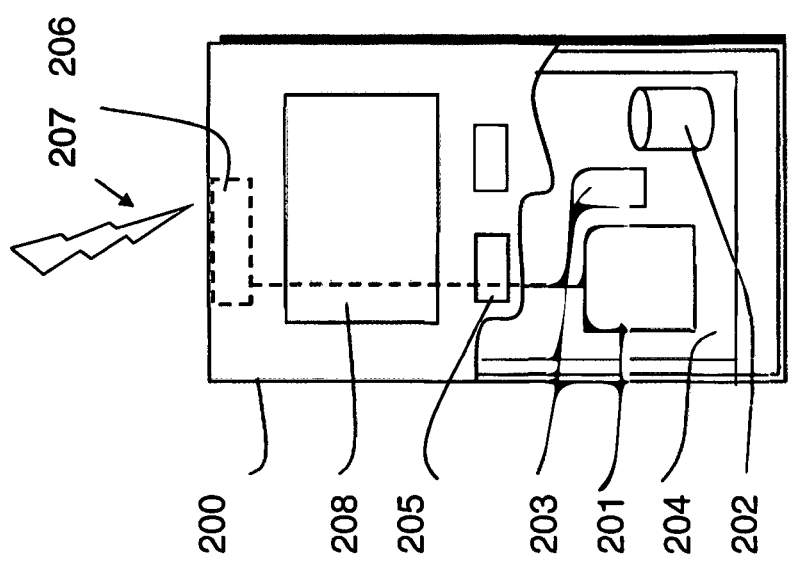
FIG. 2a shows a schematic diagram of an example mobile communication device suitable for implementing some embodiments.

A possible mobile communication device will now be described in more detail with reference to FIG. 2a showing a schematic, partially sectioned view of a communication device 200. Such a communication device is often referred to as user equipment (UE), mobile station (MS) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, an IoT device or any combinations of these or the like. The term "mobile station", may also cover any such device configured for movement, e.g. a mobile IoT device. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving (e.g., a receiver) and may transmit signals via appropriate apparatus for transmitting radio signals (e.g., a transmitter). In FIG. 2a transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 2B:
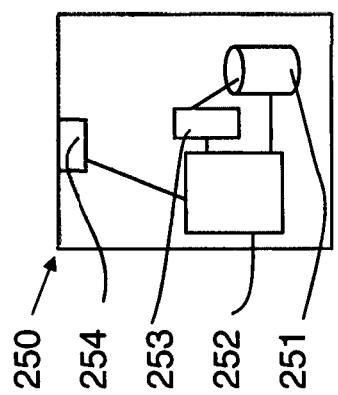
FIG. 2b shows a schematic diagram of an example control apparatus suitable for implementing some embodiments.

FIG. 2b shows an example of a control apparatus for a communication system, for example to be coupled to and/or for controlling a station of an access system, such as a RAN node, e.g. a base station, node B (for example eNB or gNB), a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 250 can be arranged to provide control on communications in the service area of the system. The control apparatus 250 comprises at least one memory 251, at least one data processing unit 252, 253 and an input/output interface 254. Via the interface the control apparatus can be coupled to a receiver and a transmitter of the base station. The receiver and/or the transmitter may be implemented as a radio front end or a remote radio head. For example the control apparatus 250 or processor 251 can be configured to execute an appropriate software code to provide the control functions.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signalling mechanisms and procedures, which may enable a device to address in-device coexistence (IDC) issues caused by multiple transceivers, may be provided with help from the LTE network. The multiple transceivers may be configured for providing radio access to different radio technologies.

In LTE LAA, two channel access procedures (which are known as listen before talk, LBT) are defined: Type 1 and Type 2. In Type 1 LBT, a node generates a random number N uniformly distributed over a contention window (where the size of contention window depends on the channel access priority class of the traffic). Once the node has measured the channel to be vacant for N times, it may occupy the channel and transmit. To align the transmission with a LTE subframe (or slot) boundary, the node may need to resort to self-deferral during the LBT procedure. In Type 2 LBT access procedures, a node performs single channel measurement in time intervals of 25 μs before transmission. For physical uplink shared channel (PUSCH) access, this type of LBT may be performed when the eNB shares its channel occupancy time (COT) with the UE. (In other words, eNB has contended for the channel and once the eNB has obtained access to the channel, it allows UEs to use a portion of its channel occupancy time for UL transmissions).

It is therefore known and configured to support UL transmission with Type 2 LBT within gNB acquired COT also on NR-unlicensed systems as it supports efficiently scheduled UL as well as UL frequency domain multiple access (FDMA) procedures.

In MulteFire, the UE may also skip LBT procedure for UL control signalling within eNB acquired COT if the UL transmission starts within 16 μs after the end of a downlink (DL) transmission.

In new radio unlicensed (NR-U) there are several wide unlicensed bands and a single gNB or a UE can occasionally access very wide bandwidths. Hence, wideband operation is one of the key building blocks for NR-U. Both carrier aggregation and bandwidth part (BWP) mechanisms are supported in the latest agreed releases for NR for wideband operations. NR-U may be configured to use both mechanisms to achieve sufficiently versatile support for wideband.

Carrier aggregation offers several benefits, such as frequency domain flexibility. For example aggregated carriers do not need to be adjacent but may be widely apart and may provide diversity for channel access. Furthermore carrier aggregation allows each carrier to employ its own listen before talk (LBT) access process producing an agile channel access system.

As such the embodiments described hereafter attempt to support carrier aggregation for NR-U (and in addition to facilitating the LAA operation with NR licensed carrier). Carrier aggregation requires multiple RF chains and increasing the price of UE transceivers. Additionally, carrier aggregation increases UE power consumption and produces latency in component carrier activation/deactivation which may be implemented to save UE power.

A concept of serving cell adaptive bandwidth (BW) configuration was introduced in R15 NR by means of bandwidth parts (BWPs). A UE may be instructed to operate on a specific part of a gNB's BW, which may be defined as a BWP. In some embodiments up to 4 BWPs can be configured separately for uplink (UL) and downlink (DL). Each BWP can be defined with respect to parameters such as subcarrier spacing (SCS), cyclic prefix, BW in terms of contiguous PRBs as well as location of the BW in the cell's total BW, K0, K1 and K2 values defining the time offsets from DL assignment reception to the beginning of PDSCH, from the end of PDSCH to HARQ-ACK transmission time, and from UL grant reception to the start of PUSCH transmission, respectively.

In situation of unpaired spectrum (in other words time division duplex, TDD, access), UL and DL BWPs can be paired, in which case the centre frequency of both BWPs is required to be the same, such that UE is not required to retune its radio frequency during UL-DL and DL-UL switch. One of the BWPs may be defined as default BWP for example in order to facilitate UE battery saving by means of inactivity timer.

A UE may have only one BWP active at a time. An active BWP can be indicated by a field in the downlink control information (DCI) or by radio resource control (RRC) signalling. BWP switching may occur after the UE has received the signalling changing the active BWP, but where the switching time is yet to be determined. In some embodiments a UE may also fall back to default BWP after a configured period of inactivity, i.e. when inactivity timer expires.

In such a manner a BWP mechanism provides an alternative wideband mechanism when accessing unlicensed spectrum on adjacent 20 MHz channels as it can provide savings in the UE cost with reduced number of RF chains. Single RF chain and FFT processing can be used to access wide bandwidths of for example 80 MHz or 160 MHz parts on the 5 GHz or 6 GHz (potential) unlicensed bands. It also improves the trade-off between UE throughput and battery consumption via fast BWP switching. As the BWP switching time may be shorter than the component carrier (de)activation time, a UE can be switched rather aggressively to narrow BWP (and back to wideband BWP) saving UE battery and with less compromised throughput rates when compared to a slower CC (de)activation method. NR BWP switching time (hundreds of microseconds, e.g. 600 μs) has clearly a different order of magnitude than a single CCA (e.g. 9 μs) slot in LBT procedure. This can create a constraint on how BWP operation and LBT can interact.

A channel contention mechanism is one of the key components for efficient wideband operation and channel contention mechanism for wideband operations needs to be considered. It should be noted that both Wi-Fi and LTE LAA LBT operate on 20 MHz channels and some of the regulatory rules, e.g. ETSI's standard, require LBT operation on 20 MHz grid at 5 GHz band. Hence, to meet regulatory requirements and to ensure fair coexistence with other systems, also NR unlicensed should support 20 MHz grid for LBT operation at least for the 5 GHz unlicensed band. In some embodiments wider LBT BWs should be supported for higher frequency unlicensed bands or for potential new unlicensed bands like the 6 GHz band.

it is understood that the embodiments may be implemented in any suitable systems however in the following examples we discuss embodiments within a NR-unlicensed wideband (larger than 20 MHz) system which operates according to the following parameters:

The system is operating in the 5 GHz unlicensed spectrum.

A large FFT size (such as 4 k FFT). The maximum number of PRBs per BWP is 275. The assumption behind is that UE implementation is based on 4 k FFT (275 PRB*12 subcarriers/PRB=3300 subcarriers).

A large sub-carrier spacing (SCS) may be 30 kHz or 60 kHz.

Furthermore, the system in the following examples has a carrier bandwidth such as 40 MHz, 80 MHz or 160 MHz.

The sub-band may be defined as one (or possibly multiple adjacent) channel(s) on an unlicensed carrier, typically having a bandwidth of 20 MHz. Furthermore, the sub-band may be aligned with the bandwidth of LBT, a sub-band may be equal to BW of single LBT (e.g. 20 MHz), or multiple LBT BWs (e.g. 40 MHz). All sub-bands may have the same BW or there may be combination of different sub-band BWs (e.g. 80 MHz carrier BW may contain e.g. three non-overlapping sub-bands of 20, 20 and 40 MHz).

In some embodiments, when operating according to unlicensed band regulations in NR-U scenario a gNB must perform LBT before it can start transmitting DL Tx burst in the cell. To meet regulatory requirements and to ensure fair coexistence with other systems, also NR-U is configured to support sub-band LBT of at least with 20 MHz resolution.

Figure 3:
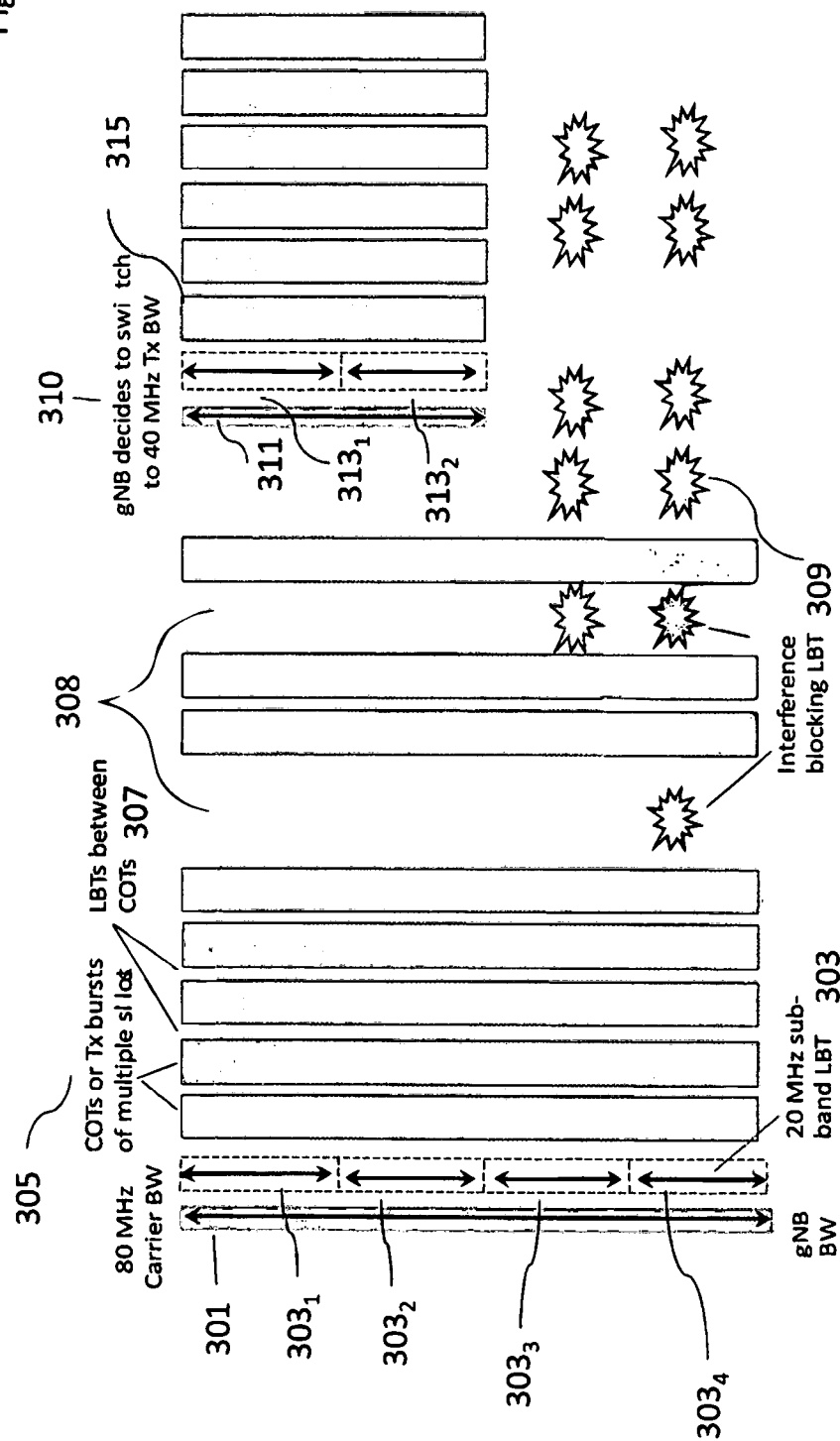
FIG. 3 shows an example of interference avoidance based on dynamic bandwidth adaption.

FIG. 3 shows possible transmission bandwidth combinations for gNB after sub-band specific LBT.

In this example the vertical axis represents the bandwidth of the system. Thus is shown a 80 MHz carrier bandwidth 301, which may be formed from a contiguous allocation of 20 MHz sub-bands 303, which may be defined as: a first 20 MHz sub-band $303_1$, a second 20 MHz sub-band $303_2$, a third 20 MHz sub-band $303_3$, and a fourth 20 MHz sub-band $303_4$. In some scenarios, also non-contiguous allocations of sub-bands can be considered and/or supported (although not shown in FIG. 3). Non-contiguous allocation may be a feasible assumption at least for gNB transmitter.

The gNB may be configured to maintain a constant BW while the UE may be instructed to operate on specific BW part, BWP. In NR-U, the gNB may be configured to try to obtain channel access on a wide BW (e.g. 80 MHz) while also performing LBT (or possibly even before LBT) based on sub-band LBT results such that the gNB is configured to gain channel access only on a part of the wide BW.

While reducing its BW, the gNB may or may not need to adjust the RF configuration (centre frequency, analogue and/or digital filters, etc.) in order to meet the regulatory rules defined for the out-of-band emissions. Also the gNB may decide on and perform the transmission bandwidth adaptation during (not necessarily at the end of) the LBT process. In the following examples transmission bandwidth (TX BW) is defined as the part of the spectrum on which gNB actually transmits after LBT. The TX BW may be equal to the carrier BW or it is a portion of carrier BW (one or more sub-bands) based on the outcome of LBT.

Thus for example as shown in FIG. 3 the horizontal axis shows time where initially the gNB is able to perform LBT and then access the full bandwidth for a full channel occupancy time (COT) or TX burst 305 before performing a further LBT 307 between the COTs 305. FIG. 3 furthermore shows the situation wherein an interference blocking source causes an interference blocking LBT 309.

This may be handled by for example missing transmission for the whole bandwidth for an occupancy time, for example the transmission gaps 308 or by the gNB being configured to switch 310 bandwidths outside of the interference blocking sources. The switching 310 to a 40 MHz bandwidth 311 comprising a first 20 MHz sub-band $313_1$ and a second 20 MHz sub-band $313_2$ which are respectively the same as the first 20 MHz sub-band $303_1$ and second 20 MHz sub-band $303_2$ of the full bandwidth allows the gNB to continue to transmit but avoid the interference.

In such situations the gNB may transmit in a COT on a narrower BW than the UE is configured to receive, it does not necessarily require UE to retune its RF to the gNB Tx BW for DL reception (although without RF retuning, UE remains more vulnerable to interference that it receives within RF inband). On the other hand, it might be difficult if not impossible for a UE to facilitate rapid retuning of the UE RF at the time when DL transmission from the gNB starts. Moreover, during the retuning UE would not be able to receive DL signals.

The following embodiments further enhance such flexible BW operations and have the following advantages.

The ability of the UE to know that the gNB transmission BW is less than the active BWP BW. This is because prior to the start of DL transmission, the UE knows only its active BWP BW, which may be the same as the wide carrier BW (i.e. all sub-bands), but not necessarily the same as the actual transmission BW (TX BW).

Furthermore, the scheduling of PUSCH/PUCCH only with LBT (or no LBT) within the BW that it is using in the current DL Tx burst part of a COT is improved as previously the gNB may have been configured to share the COT with the UE only on the Tx BW on which it has acquired channel access.

Additionally, in some embodiments the limitation that before starting the PUSCH/PUCCH transmission (with Type 2 LBT, or possibly without LBT), the UE may need to adapt its BW and centre frequency to correspond to the BW of the DL tx COT or PUSCH allocation may in some embodiments be relaxed.

Conventional licensed (LTE-L) system are configured such that the UE can be configured with initial BWP+up to 4 DL/UL BWPs. The BW parts may also be overlapping in frequency. In such systems only one BWP is active at a time and furthermore the UE is configured to switch its active BWP either based on either RRC signalling or based on an indication in a DL assignment or an UL grant (DCI format 0_1 and DCI 1_1), or by inactivity timer (causing fall back to default BWP), However, it is noted that the described sub-band based BW adaptation implies many contiguous Tx BW options (with different bandwidth and/or carrier frequency). For example, with 4 sub-bands, there exists already 10 different Tx BW/BWPs contiguous options (4× single sub-bands, 3× pair sub-band combinations, 2× triple sub-band combinations and 1× quad sub-band). Even a reduction to 7 requires significant configuration burden. Further, if the number of sub-bands is extended beyond 4, the number of contiguous Tx BW options increases rapidly.

Hence the following embodiments attempt to reduce the significant configuration burden as a majority of physical (uplink and downlink) shared channel (PxSCH) and physical (uplink and downlink) control channel (PxCCH) parameters are configured for UL and DL BWPs.

BWP operation on NR-U has been discussed and BWP options are considered. Some have discussed multiple BWPs, where each BWP is assumed to correspond to single sub-band LBT. For the case of single BWP, they note that Tx BW has to be reduced based on LBT outcome for both DL and UL.

They note a couple of specific aspects, that indication of actual Tx BW is necessary, e.g. based on DMRS detection or PDCCH indication, that data puncturing is involved and possibly adjusting the CORESET location. However, there is no concrete solution how to dynamically adapt BWP, e.g. they do not consider changing BWP or changing related configurations or necessary signalling.

The concept associated with the embodiments described hereafter is the provision of dynamic BWP adaptation with respect to sub-band LBT operations. The embodiments therefore introduce a new BWP category which is defined as 'temporal BWP'. Temporal BWP differs from normal BWP in terms of configuration and BWP switching, resulting in simplified configuration and control signalling. Additionally, as discussed hereafter the embodiments define BWP switching or activation/de-activation mechanisms suitable for dynamic Tx BW adaptation in NR-U operations. In the following discussion is presented aspects of temporal BWP configuration as well as transitions between temporal BWP and associated NR BWP.

Characteristics of the Temporal BWP configuration include configuration of temporal BWP configuration parameters, the inheriting of parameters from associated NR BWP parameters, and dynamic indicating and/or selecting of configuration parameters.

In the following embodiments an associated NR BWP corresponds to a Rel-15 active BWP. It can be defined on a sub-band by sub-band basis, for example as Nx20 MHz sub-bands.

For each temporal BWP a BW (for example the length in PRBs) as well as a set of possible starting PRBs and centre frequencies (relative to PRB0 of the associated NR BWP or relative to CRB0) are configured.

In the examples discussed in further detail there may be temporal BWPs for 20 MHz and 40 MHz, while the associated NR BWP may be configured for 80 MHz BW, however it would be understood that in other embodiments the bandwidths for the temporal BWPs and associated NR BWP differ from those in the example presented and may be any suitable value.

In the examples discussed hereafter the UE is configured to dynamically select the starting PRB from configured/ predetermined set of start PRBs based on indication from the gNB. This is discussed in more detail with BWP switching.

In some embodiments the temporal BWP inherits configurations from associated NR BWP. For example, in some embodiments the temporal BWP BW is a portion of the associated NR BWP BW. Additionally, the number of temporal BWP configurations available may be determined (or upper limited) based on the number of 20 MHz sub-bands (or suitable sub-band width) of the associated NR BWP. For example, when the associated NR BWP occupies 4×20 MHz sub-bands, there can be (up-to) 3 temporal BWP configurations defined: 20 MHz, 40 MHz, 60 MHz.

In some embodiments the set of inherited properties of the NR BWP may include, for example, the PRB grid, the CSI-RS configuration, the presence/location of SSB on the BWP, SCS, K0, K1, K2 values, PUCCH resource configurations or other BWP-specific parameters.

In some embodiments some NR BWP configurations can be transformed to temporal BWP configurations by truncating, padding, masking or shifting the configurations or configured parameter values or parameter ranges of associated NR BWP.

The truncation and masking operations in some embodiments may depend on temporal BWP BW and/or starting PRB while shifting may depend on temporal BWP starting PRB.

The number of PRBs may be defined separately for each temporal BWP configuration to fulfil a spectrum emission mask for different temporal BWP configurations.

In some embodiment other transformation rules may be defined.

Figure 4:
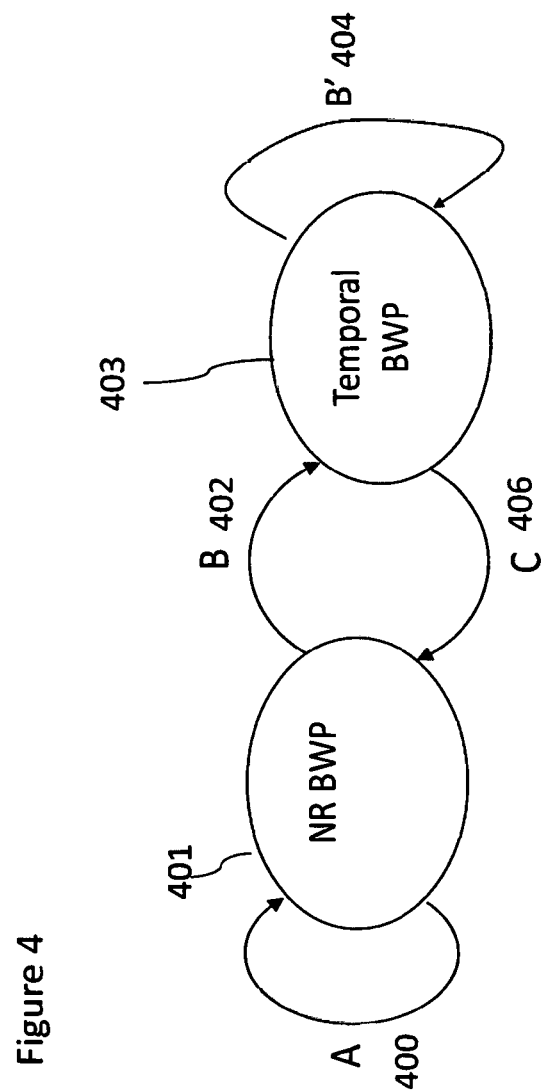
FIG. 4 shows an example switching between NR bandwidth parts and temporal bandwidth part activation/deactivation according to some embodiments.

The relationships between an associated NR BWP and temporal BWP as shown with respect to FIG. 4.

The associated NR BWP 401 may correspond to a Rel-15 BWP that is active. It can be defined for example as Nx20 MHz (or other defined width) sub-bands, where N is a positive integer.

The BWP switching A 400 operation in which an active NR BWP can be switched to another configured NR BWP according to Rel-15 BWP switching mechanism. In this operation each NR BWP may have its own associated temporal BWPs. In some embodiments where an NR BWP (e.g. default BWP) corresponds to a single sub-band only there may not be any associated temporal BWPs.

In some embodiments when a UE is indicated to switch to a new activated NR BWP with associated temporal BWP(s), the UE is configured to determine whether to switch to the indicated NR BWP or directly to a temporal BWP associated to the indicated new BWP. This may be seen as a combined BWP switching A 400 and temporal BWP activation B 402.

This determination may be the UE being configured to determine that the gNB is currently transmitting on a BW narrower than the BW of the indicated active NR BWP and NR BWP switch would occur during the ongoing DL burst. If this determination is correct then in some embodiments the UE is configured to switch to the indicated active NR BWP's temporal BWP that corresponds to the ongoing Tx BW of DL transmission.

This situation may occur for example when the UE switches from a default (narrow, e.g. 20 MHz) BWP to a wideband BWP (e.g. 80 MHz) but temporarily uses a narrower Tx BW (e.g. 40 MHz).

A temporal BWP activation (shown by the switch from NR BWP 401 to temporal BMP 403 via step B or from temporal BMP 403 to (different) temporal BWP 403 via step B' 404) is also shown in FIG. 4, After a UE has been configured with an active NR BWP, the UE may further activate a temporal BWP (associated to the current active NR BWP) or change the activated temporal BWP based on DCI indication.

The determination of the activation event, or determination that a temporal BWP is activated can be UE-specific or common for the cell. In the former case, activation may be based on UL grant or DL assignment and in later case for example on a group common-physical downlink control channel (GC-PDCCH).

In some embodiments the determination may be based on explicit signalling. For example a DCI field may be defined on the UL grant/DL assignment or in the GC-PDCCH.

In some embodiments the determination may be based on implicit signalling. For example a temporal BWP activation may be triggered by detection of UL grant or DL assignment (in the case that the UE reports HARQ feedback via this BWP), or some other channel or signal.

In some embodiments there can be also further conditions on implicit indication of temporal BWP activation. For example on the UL LBT type signalled: the temporal BWP is activated only if the signalled LBT type is single shot LBT, or UL LBT is to be skipped.

In some embodiments the activated temporal BWP can be determined based on an explicit indicator on DCI, or implicitly for example from the temporal BWP (BW and starting PRB) can be determined by the ongoing gNB DL burst transmission BW (Tx BW).

In some embodiments the UE performing the determination may use a preamble or reference signals transmitted by the gNB. For example, a starting PRB and centre frequency may be determined (selected from the configured set of possible values) by the lowest sub-band (or PRB) on which gNB transmits in the current COT/DL burst.

In some embodiments the NR BWP remains active when one of its associated one or more temporal BWPs is activated.

A temporal BWP deactivation operation is shown in FIG. 4 by step C 406.

In some embodiments the deactivation operation may be performed (immediately) after the UL transmissions (PUCCH, PUSCH) within the shared COT. (PUCCH, PUSCH being within the shared COT can be identified for example by the UL LBT type indicated for the UL transmission).

In some embodiments the deactivation may be performed after a predetermined inactivity time. The inactivity time may be measured in slots or frames, and may be higher layer configured or indicated via a corresponding DCI field (selecting one of the RRC configured values).

In some embodiments the deactivation may be determined also with same mechanisms as activation. For example in some embodiments the deactivation may be determined based on a DL assignment or UL grant as part of the temporal BWP activation B 402 operation.

Figure 5:
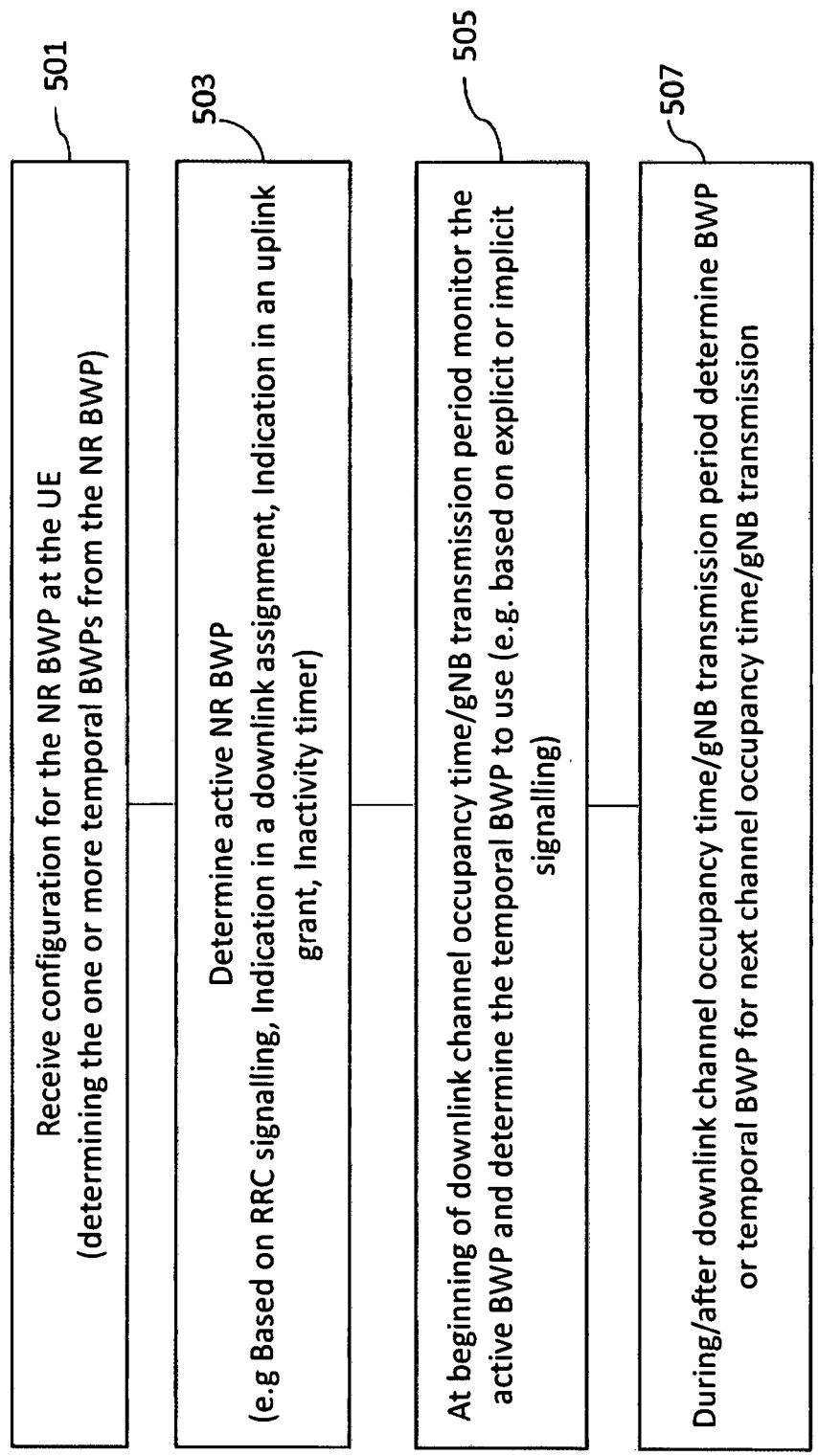
FIG. 5 shows an example flow diagram of the operation of temporal bandwidth part activation/deactivation according to some embodiments according to some embodiments.

With respect to FIG. 5 the operation and use of the temporal BWP with respect to the UE is described in further detail.

The UE in a first operation receives a configuration for the NR BWPs. In some embodiments the UE can be configured with an initial BWP and up to a determined number (for example 4) DL/UL BWPs. In some embodiments the BWPs may also be overlapping in frequency, In some embodiments the NR BWP configuration may further comprise one or more (associated) temporal BWPs. The temporal BWPs may be overlapping in frequency. The bandwidth of each temporal BWP is less than the bandwidth of the associated NR BWP. Thus for example the temporal BWPs may comprise one or more 20 MHz sub-bands. As discussed above the temporal BWP settings or configurations may be determined from performing truncation, padding, masking, shifting or some other processing of the inherited or associated NR BWP configurations or configured parameter values or parameter ranges. In other words a UE may be configured to receive a first bandwidth part configuration caused to support dynamic adaptation of transmission bandwidth part in listen before talk communication systems, the first bandwidth part configuration comprising at least two bandwidth parts: a first bandwidth part and at least one associated temporal bandwidth part, The operation of receiving the NR BWP configuration and then determining the one or more temporal BWPs from the NR BWP is shown in FIG. 5 by step 501.

The UE may then be configured to determine the active NR BWP. In some embodiments this determination of the active NR BWP may be either based on either RRC signalling, based on an indication in a DL assignment or an UL grant (DCI format 0_1 and DCI 1_1) being DCI formats scheduling PDSCH and PUSCH and containing BWP index fields, or by an inactivity timer (causing the UE to fall back to the default BWP). In other words the UE may be configured to determine which of the at least two bandwidth parts is used for a transmission burst.

This determination of the active NR BWP is shown in FIG. 5 by step 503.

At the beginning of a DL COT (or a gNB initiated TxOP) the UE may be configured to monitor the active BWP and determine the temporal BWP to use. The determination may be performed based on explicit or implicit signalling. As described earlier in some embodiments the determination may be based on explicit signalling such as a DCI field in the UL grant/DL assignment or in the GC-PDCCH or implicit signalling triggered by detection of UL grant or DL assignment (in the case that the UE reports HARQ feedback via this BWP), or some other channel or signal.

In some embodiments the UE may be configured to monitor the active BWP and determine the temporal BWP to use the same as in previous (DL) COT.

Furthermore, in some embodiments the UE may be configured to determine that the associated NR BWP remains active when the temporal BWP is in use. In summary the UE may be configured to determine for the transmission burst a second, temporal, bandwidth part configuration caused to determine the transmission parameters for the transmission burst based on the at least one associated temporal bandwidth part and the determining which of the at least two bandwidth parts is used for the transmission burst.

The operation of determining the temporal BWP to use is shown in FIG. 5 by step 505.

Then optionally in some embodiments during or after a DL COT (or the gNB initiated TxOP) the UE is configured to determine the BWP or temporal BWP for the next COT (or TxOP). In some embodiments the UE is configured to return to monitoring the full active NR BWP. Thus for example the UE is configured to return to monitoring the full active NR BWP (immediately) after the UL transmissions (PUCCH, PUSCH) within the COT. In such embodiments the PUCCH, PUSCH being within a COT can be identified for example by the UL LBT type indicated for the UL transmission.

In some embodiments the UE is configured to return to monitoring the full active NR BWP after a predetermined inactivity time. The time may be measured in slots, subframes or frames, and may be higher layer configured or indicated via a corresponding DCI field (selecting one of the RRC configured values).

In some other embodiments the UE can be instructed (e.g. with a DL assignment or an UL grant) to monitor the same or different temporal BWPs in the next DL COT (gNB initiated TxOP).

Furthermore, in some embodiments, the UE is configured to return to monitor its initial, default or other pre-configured NR BWP.

The 'during or after' DL COT operations of determining BWP or temporal BWP for the next COT is shown in FIG. 5 by step 507.

Figure 6:
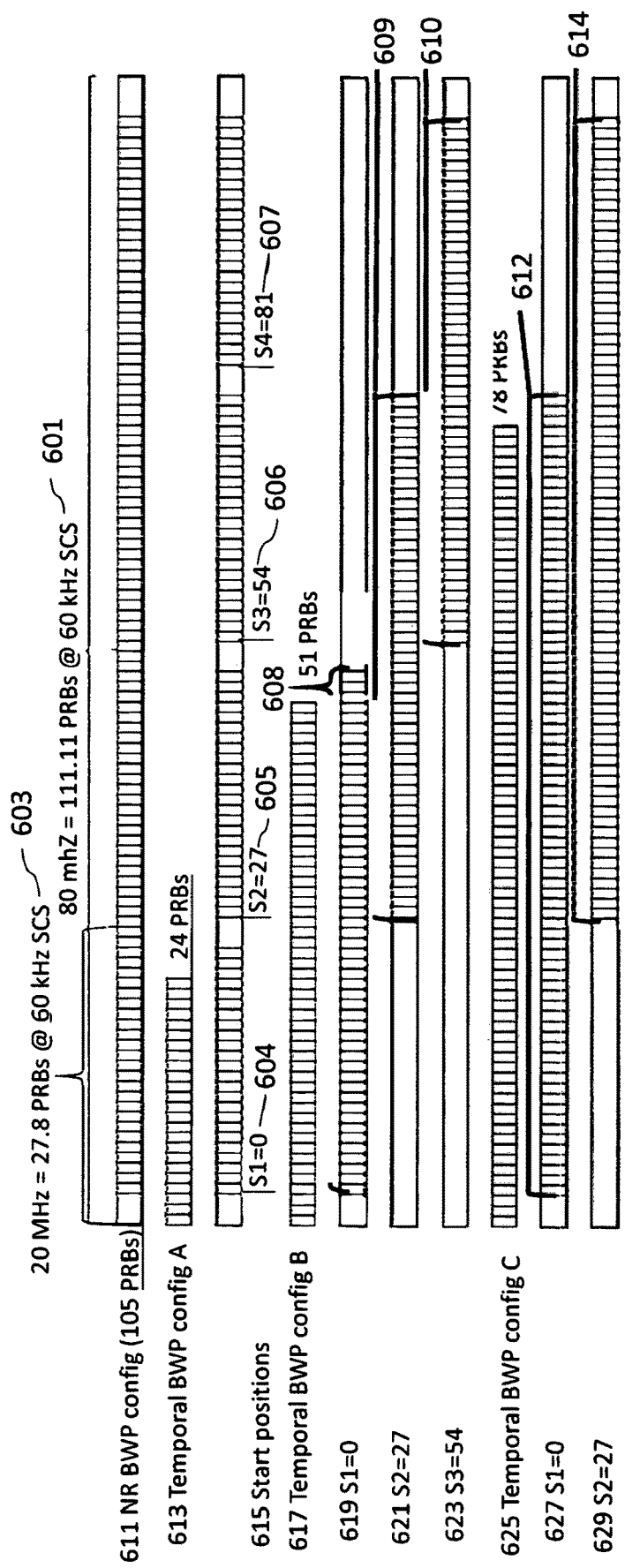
FIG. 6 shows example temporal bandwidth part bandwidth and starting physical resource block configurations according to some embodiments.

With respect to FIG. 6 is shown example temporal BWP configurations in an example system wherein a 2 k FFT is employed and where the Sub-carrier spacing=60 kHz. In this example the NR BWP 611 contains 4×20 MHz sub-bands 603 and 105 PRBs (the shaded PRBs) within 111.11 PRBs @ 60 kHz SCS 601. The shaded PRBs corresponds to the active NR BWP configuration where and the first shaded PRB can be seen as PRB #0 according to common PRB indexing.

A first temporal BWP configuration A is shown. This is shown in itself 613 comprising 24 PRBs. Then configuration A start positions are shown on line 615. A first start position S1 604 is shown starting from PRB 0 (wrt common PRB indexing), a second start position S2 605 is shown starting from PRB 27, a third start position S3 606 is shown starting from PRB 54 and a fourth start position S4 607 is shown starting from PRB 81.

A second temporal BWP configuration B is shown. This is shown in itself 617 comprising 51 PRBs. Then configuration B start positions are shown on lines 619, 621 and 623. A first start position S1 608 is shown starting from PRB 0, a second start position S2 609 is shown starting from PRB 27, and a third start position S3 610 is shown starting from PRB 54.

A third temporal BWP configuration C is shown. This is shown in itself 625 comprising 78 PRBs. Then configuration C start positions are shown on lines 627 and 629. A first start position S1 612 is shown starting from PRB 0 and a second start position S2 614 is shown starting from PRB 27.

As discussed earlier the temporal BWP may inherit aspects of the associated NR BWP configurations, but some of those may be transformed based on temporal BWP BW and starting PRB. For example, available PRB grid or CRI-RS configuration can be obtained by masking the NR BWP PRB grid based on the temporal BWP BW and starting PRB. In some embodiments some resource configurations, like PUCCH or SRS resource allocations can be obtained by shifting the configured resources with the determined starting PRB.

In some embodiments the BWP to be used on UL is clear from the beginning of COT. Also the used PUCCH resources are indicated during the COT. Hence PUCCH resource ambiguity can be avoided.

Figure 7:
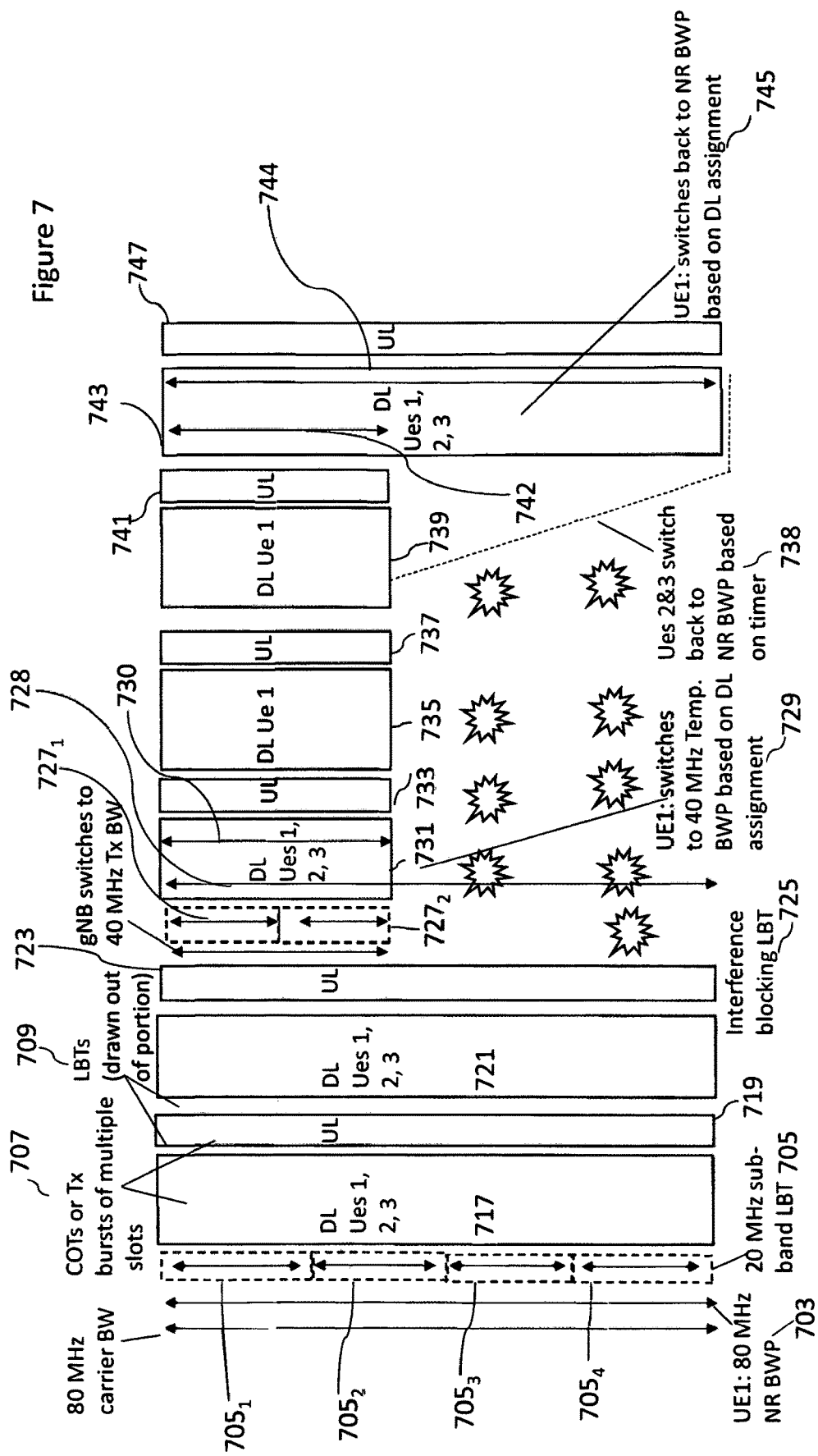
FIG. 7 shows a diagram of a temporal BWP operation of a gNB changing bandwidth from 80 MHz to 40 MHz and back.

Temporal BWP operation is illustrated in FIG. 7, which shows where a gNB changes BW from 80 MHz to 40 MHz and back. It should be noted that a UE just receiving DL (on reduced BW) may not need to switch (in other words adapt its RF) to temporal BWP.

In FIG. 7, similar to FIG. 3, the vertical axis represents the bandwidth of the system. Thus is shown 80 MHz carrier bandwidth 701, and furthermore is shown with respect to UE1 80 MHz NR BWP 703. The 80 MHz bandwidth which may be formed from a contiguous allocation of 20 MHz sub-bands 705, which may be defined as: a first 20 MHz sub-band $705_1$, a second 20 MHz sub-band $705_2$, a third 20 MHz sub-band $705_3$, and a fourth 20 MHz sub-band $705_4$.

The gNB may be configured to maintain a constant BW while the UE may be instructed to operate on specific BW part, BWP. Thus as shown in FIG. 7 the horizontal axis shows time where initially the gNB is able to perform LBT 707 and then access the full bandwidth for a downlink (DL) full channel occupancy time (COT) or TX burst 717 of multiple slots to UEs 1, 2 and 3 and furthermore the UL full channel occupancy time (COT) or RX burst 719. DL COT 717 and UL COT 719 may be part of shared COT. COTs are separated by Type 1 or Type 2 LBTs 309 performed between the COTs 707. FIG. 7 shows a further cycle of a downlink (DL) full channel occupancy time (COT) or TX burst 721 of multiple slots to UEs 1, 2 and 3 and furthermore the UL full channel occupancy time (COT) or RX burst 723 before an interference blocking source causes an interference blocking LBT 725.

FIG. 7 furthermore shows where based on the interference blocking LBT the gNB switches to 40 MHz Tx BW 727. The gNB switching to a 40 MHz bandwidth 727 comprises a first 20 MHz sub-band $727_1$ and a second 20 MHz sub-band $727_2$ which are respectively the same as the first 20 MHz sub-band $705_1$ and second 20 MHz sub-band $705_2$ of the full bandwidth allows the gNB to continue to transmit but avoid the interference.

Initially following the switch the UE1 is still using the full 80 MHz BWP (as shown by arrow 728, but based on a DL assignment (within the DL COT 731) the UE1 is configured to switch 729 to the 40 MHz temporal BWP (as shown by the arrow 730).

This 40 MHz temporal BWP may be operational for several cycles of DL and UL COTs while the interference blocking LBT 725 are detected and are present as shown in FIG. 7 by COT DL 731, UL 733, DL 735, UL 737, DL 739, and UL 741.

Following the absence of interference blocking LBT 725 the gNB may switch back to the use of the full 80 MHz BW and the UE (for example UE1) configured to transition back to the full NR BWP based on an explicit DL assignment during the DL COT 743 such that UE1 is still using the 40 MHz temporal BWP (as shown by arrow 742), but based on a DL assignment (within the DL COT 743) the UE1 is configured to switch 745 to the full 80 MHz NR BWP (as shown by the arrow 744) and the use the full 80 MHz NR BWP for the following UL COT 747.

Furthermore, is shown in FIG. 7 an example of where the switching back 738 to the use of the full 80 MHz BW by the gNB causes at UE (for example UE2 and 3) a 'inactivity' timer to finish and the UE to transition back to the full NR BWP, because UE2 and UE3 have no DL nor UL transmissions during COT 731 and 733.

It should be noted that NR BWP operation is aimed to change BW based on UE battery consumption, amount of data served for UE, or to balance load within the cell. Temporal BW aims to facilitate dynamic gNB BW adaptation to avoid interference blocking channel access on a part of channel. Both mechanisms may run in parallel.

As such in some embodiments there may be implemented two timers for controlling the active BWP. As indicated above a temporal BWP may be deactivated based on 'inactivity' or based on an inactivity timer. It should be noted that the temporal BWP deactivation timer may in some embodiments be shorter than the default BWP inactivity timer, allowing the UE to be configured to return to the (wider) temporal BWP equal to associated NR BWP, while the timer for default BWP fall-back is still running. The intention of first timer is thus to adapt BW to temporally varying interference while the latter timer facilitates UE power saving during periods of no or low activity from the UE.

In some embodiments when a UE determines the temporal BWP (bandwidth and starting PRB) implicitly, a single BWP switching field in DCI can be employed. When the gNB orders NR BWP switch, it can be expected to be a longer scale change than temporal BWP, reflecting, for example, the UE buffer status or gNB's semi-static adaptation to interference environment. Hence, temporal BWP activation occurs first for transmission of DL assignment associated PUCCH or UL grant scheduled PUSCH, and the indicated NR BWP switch occurs right after DCI triggering NR BWP switch is received –.

Furthermore, in some embodiments and if necessary, these examples can be easily applied to normal BWP switching in the case that the concept of temporal BWP is not adapted.

Therefore, in summary the introduction of temporal BWP as discussed in the embodiments herein may be able to reduce the amount of partially redundant BWP configurations. The temporal BWP may also enhance BWP operation such that when gNB returns to NR BWP (after reducing Tx BW temporarily), gNB does not need explicitly switch BWP also for active UEs temporarily not scheduled (e.g. due to empty buffer). UEs simply returns to NR BWP after a certain time of inactivity, as illustrated with UE 2 and 3 in FIG. 7.

This prevents the need to switch a UE back to NR BWP only when the UE is scheduled next time, and reducing a BWP switching delay and preventing the waste of available resources meanwhile.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.
This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:
1. An apparatus comprising:
at least one processor; and
at least one non-transitory memory storing instructions, that when executed by the at least one processor, cause the apparatus to at least perform:

receiving from a communication network a first bandwidth part configuration to support dynamic adaptation of transmission bandwidth part in sub-band listen before talk communication systems operations, the first bandwidth part configuration comprising at least two bandwidth parts: a first bandwidth part and an associated bandwidth part, wherein the associated bandwidth part is a portion of the first bandwidth part and the associated bandwidth part is using a narrower bandwidth than the first bandwidth part;

determining the associated bandwidth part is an active bandwidth part of the at least two bandwidth parts, wherein the determining is using at least one reference signal from the communication network;

identifying a second bandwidth part configuration to determine transmission parameters for the transmission burst based on determining that the associated bandwidth part is used for a transmission burst from the communication network;

based on at least the determined transmission parameters, switching the transmission burst from the first bandwidth part to the associated bandwidth part comprising shifting transmission start positions for the transmission burst based on determining the associated bandwidth part is being used for the transmission burst.

2. The apparatus as claimed in claim 1, wherein the at least two bandwidth parts at least partially overlap in frequency.

3. The apparatus as claimed in claim 1, wherein a bandwidth of each of the associated bandwidth part is less than the bandwidth of the first bandwidth part.

4. The apparatus as claimed in claim 1, wherein the at least one non-transitory memory storing instructions is executed by the at least one processor to cause the apparatus to perform:
generating the second bandwidth part configuration from the first bandwidth part configuration by modifying first bandwidth part configuration start positions.

5. The apparatus as claimed in claim 4, wherein the at least one non-transitory memory storing instructions is executed by the at least one processor to cause the apparatus to perform:
modifying the first bandwidth part configuration start positions comprises performing at least one of: truncating; padding; masking; and shifting, the configuration start positions values or configuration start positions ranges of the first bandwidth part configuration.

6. The apparatus as claimed in claim 1, wherein the at least one non-transitory memory storing instructions is executed by the at least one processor to cause the apparatus to perform:
receiving at least one other bandwidth part configuration, and determining which of the at least two received bandwidth part configurations is active,
wherein the determining which of the at least two received bandwidth part configurations is active is based on one of: a radio resource control signalling; a received indicator within a downlink assignment; a received indicator within an uplink grant; and a first inactivity timer, the expiration of the inactivity timer indicating the active bandwidth part configuration is a default bandwidth part configuration.

7. The apparatus as claimed in claim 1, wherein the first bandwidth configuration is active when the second bandwidth configuration is employed.

8. The apparatus as claimed in claim 1, wherein identifying the associated bandwidth part of the at least two bandwidth parts is to be used for the transmission burst is based on at least one of:
determining which of the at least two bandwidth parts is active during the succeeding transmission burst;
determining which of the at least two bandwidth parts are active after a determined inactivity time period determined by a second inactivity timer; or
a received indicator controlling the apparatus to use the same second bandwidth part configuration.

9. The apparatus as claimed in claim 1, wherein the at least one non-transitory memory storing instructions is executed by the at least one processor to cause the apparatus to perform:
receiving a signal; and
transmitting a further signal.

10. An apparatus comprising:
at least one processor; and
at least one non-transitory memory storing instructions, that when executed by the at least one processor, cause the apparatus to at least perform:
transmitting to a further apparatus a first bandwidth part configuration to support dynamic adaptation of transmission bandwidth part in sub-band listen before talk communication systems operations, the first bandwidth part configuration comprising at least two bandwidth parts: a first bandwidth part and an associated temporal bandwidth part, wherein the associated temporal bandwidth part is a portion of the first bandwidth part,
wherein the further apparatus is caused to determine which of the at least two bandwidth parts is used for a transmission burst and determine for the transmission burst a second bandwidth part configuration comprising transmission start positions for the transmission burst based on the associated temporal bandwidth part and the determining which of the at least two bandwidth parts is used for the transmission burst, and
wherein the further apparatus is caused to based on at least determined transmission parameters, switch the transmission burst from the first bandwidth part to an associated temporal bandwidth part comprising shifting transmission start positions for the transmission burst based on determining the associated temporal bandwidth part is being used for the transmission burst.

11. The apparatus as claimed in claim 10, wherein the at least one non-transitory memory storing instructions is executed by the at least one processor to cause the apparatus to perform:
selecting one of the first bandwidth part configuration and at least one other bandwidth part configuration; determining transmission parameters for a transmission burst between the apparatus and the further apparatus based on the selected bandwidth part configuration; and transmitting to the further apparatus the at least one other bandwidth part configuration, wherein the further apparatus is caused to determine which of the at least two received bandwidth part configurations is active.

12. The apparatus as claimed in claim 10, wherein the at least one non-transitory memory storing instructions is executed by the at least one processor to cause the apparatus to perform:
transmitting at least one further signal caused to enable the further apparatus to determine which of the at least two bandwidth parts is used for a transmission burst.

13. A method comprising:
receiving a first bandwidth part configuration to support dynamic adaptation of transmission bandwidth part in sub-band listen before talk communication systems operations, the first bandwidth part configuration comprising at least two bandwidth parts:
a first bandwidth part and an associated temporal bandwidth part, wherein the associated temporal bandwidth part is a portion of the first bandwidth part;
determining which of the at least two bandwidth parts is used for a transmission burst;
determining for the transmission burst a second bandwidth part configuration to determine the transmission parameters for the transmission burst based on the associated temporal bandwidth part and the determining which of the at least two bandwidth parts is used for the transmission burst;
based on at least the determined transmission parameters, switching the transmission burst from the first bandwidth part to the associated temporal bandwidth part comprising shifting transmission start positions for the transmission burst based on determining the associated temporal bandwidth part is being used for the transmission burst.

14. A method comprising:
transmitting to an apparatus a first bandwidth part configuration to support dynamic adaptation of transmission bandwidth part in sub-band listen before talk communication systems operations, the first bandwidth part configuration comprising at least two bandwidth parts: a first bandwidth part and an associated temporal bandwidth part,
wherein the associated temporal bandwidth part is a portion of the first bandwidth part, and
wherein the apparatus is caused to determine which of the at least two bandwidth parts is used for a transmission burst and determine for the transmission burst a second bandwidth part configuration such that the apparatus is caused to determine the transmission parameters for the transmission burst based on the associated temporal bandwidth part and the determining which of the at least two bandwidth parts is used for the transmission burst, and
wherein the further apparatus is caused to based on at least determined transmission parameters, switch the transmission burst from the first bandwidth part to the associated temporal bandwidth part comprising shifting transmission start positions for the transmission burst based on determining the associated temporal bandwidth part is being used for the transmission burst.

15. The apparatus as claimed in claim 1, wherein the associated bandwidth part comprises at least one associated temporal bandwidth part, wherein the at least one associated temporal bandwidth part is using temporal bandwidth part configuration parameters taken from associated new radio bandwidth part parameters and at least one of a dynamic indication or selection of configuration parameters.

* * * * *